US010482514B1

(12) United States Patent
Crain et al.

(10) Patent No.: US 10,482,514 B1
(45) Date of Patent: Nov. 19, 2019

(54) PRECIOUS METALS TRANSACTION SYSTEMS AND METHODS

(71) Applicants: Gary Crain, Cooper City, FL (US); Rafael Suarez, Jr., Miami Beach, FL (US)

(72) Inventors: Gary Crain, Cooper City, FL (US); Rafael Suarez, Jr., Miami Beach, FL (US)

( * ) Notice: Subject to any disclaimer, the term of this patent is extended or adjusted under 35 U.S.C. 154(b) by 406 days.

(21) Appl. No.: 15/597,483

(22) Filed: May 17, 2017

Related U.S. Application Data (63) Continuation of application No. 14/154,891, filed on Jan. 14, 2014, now abandoned.

(60) Provisional application No. 61/752,505, filed on Jan. 15, 2013.

(51) Int. Cl.
*G06Q 30/06* (2012.01)

(52) U.S. Cl.
CPC ................ *G06Q 30/0609* (2013.01)

(58) Field of Classification Search
CPC ............................................. G06Q 30/06–08
USPC ............................................. 705/26.1–27.2
See application file for complete search history.

(56) References Cited

U.S. PATENT DOCUMENTS

| 7,143,062 B2 | 11/2006 | Turk et al. |
| 7,206,763 B2 | 4/2007 | Turk |
| 7,844,547 B2 | 11/2010 | Amos |
| 8,577,689 B1* | 11/2013 | Czarnetzky ............ G06Q 10/00 705/1.1 |
| 2005/0082364 A1* | 4/2005 | Alvarez ............... G06Q 20/027 235/381 |
| 2012/0016725 A1 | 1/2012 | Kraft et al. |

OTHER PUBLICATIONS

Handheld XRF: How it works, available at: https://www.bruker.conn/products/x-ray-diffraction-and-elemental-analysis/handheld-xrf/how-xrf-works.html.*
Metal Analysis & Metal Identification, available at: https://www.bruker.com/products/x-ray-diffraction-and-elemental-analysis/handheld-xrf/metal-analysis.html.*

* cited by examiner

*Primary Examiner* — Ming Shui
(74) *Attorney, Agent, or Firm* — Mark D. Bowen; Malin Haley DiMaggio & Bowen, P.A.

(57) ABSTRACT

Systems and methods directed to the purchase of articles formed of precious metals are disclosed. Precious metal content is analyzed using an x-ray fluorescence ("XRF") analysis instrument to determine alloy content, in combination with an ultrasound or electrical conductivity instrument to confirm uniformity of cross-sectional content. The present method thus advances the art of precious metals transactions by precisely analyzing and determining precious metal content and purity, and combining said data with real-time pricing and a digital record of the transaction including the identity of the seller. An automated system is disclosed for fully automating the purchasing of article of precious metals.

4 Claims, 5 Drawing Sheets

PRECIOUS METALS TRANSACTION SYSTEMS AND METHODS

CROSS REFERENCE TO RELATED APPLICATIONS

This application is a continuation of U.S. patent application Ser. No. 14/154,891, filed on Jan. 14, 2014, which claims the benefit of provisional U.S. Patent Application Ser. No. 61/752,505, filed on Jan. 15, 2013.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all rights whatsoever.

BACKGROUND OF THE INVENTION

1. Field of the Invention

The present invention relates generally to transactions involving precious metals, and more particularly to a method for precious metal transactions and an automated system for practicing said method by automated analysis and valuation of articles based on precious metal content, weight, and real time precious metals pricing, whereby precious metals articles may be purchased in accordance with transactions that comply with governmental regulations.

2. Description of Related Art

The value of precious metals, such as gold and silver, has risen dramatically in recent years. The rise in price has caused people to seek to sell articles made of precious metals. Whether fashioned into an article of jewelry or harvested as scrap, precious metal, such as gold is considered a liquid asset that can be easily sold. While gold is often sold in large quantities in the form of securities, many people with just a little gold, such as a piece of jewelry, often sell their metal to pawnshops, jewelers, and gold buyers. The price escalation associated with precious metals has also resulted in a proliferation of counterfeit gold and silver products. Among the counterfeit products are counterfeit gold bars with embedded tungsten rods contained within an outer layer of genuine gold, and counterfeit gold coins having tungsten powder encased within an genuine gold outer layer.

In order to determine the value of an article of gold, one must determine the gold content often measured by Karat (e.g. 10K, 12K, 14K, 18K, 22K and 24K). Karat purity is measured as 24 times the purity by mass: $X=24\ M_g/M_m$, where X is the Karat rating of the material, $M_g$ is the mass of pure gold in the material, and $M_m$ is the total mass of the material. Thus, 24-karat gold is fine (99.9% Au), and 18-karat gold is 18 parts gold and 6 parts another metal (forming an alloy), and so forth.

The ability to test the purity of gold is important for anyone who is involved with the buying or selling of gold. Simply because an item is stamped as 14-karat or 18-karat does not guarantee that it actually contains the purity content indicated. It is well known that fake gold articles exist in the gold market, particularly because gold jewelry has virtually no regulation or oversight. Sometimes lower quality gold will be stamped with a higher-grade marking, or other times it may not be gold at all, but rather layered with gold in such a way that it is not immediately apparent that it is a plated item. In order to protect against forgeries and to ensure that one participating in the buying of gold is getting what he pays for, it is important to test the purity of the gold.

One common method of testing the karat value of gold (as well as other precious metals such as platinum and silver) involves the use of a black acid testing stone, testing needles, and testing acid. In accordance with this method the gold piece is used to scratch the testing stone. Next to that position, an appropriate testing needle (e.g. 10, 12, or 14K) is used to make a scratch. Next, a drop of the appropriate acid is placed on the stone where the gold was scratched off. If the gold is the same karat or higher, the color of the scratch mark for the gold piece will appear the same as the mark from the needle. It that gold piece is a lower karat, the scratched deposit will become fainter and may eventually disappear. When testing for 18K, the user scratches the test piece on the stone and applies 18K acid. Any gold that is less than 18K will become faint or disappear within approximately 30 seconds, and the mark that remains on the stone is 18K or higher. Other variations are used to test 20K and 24K, as well as other precious metals such as platinum and white gold. This testing method, however, is limited in that it only samples the surface material of the article.

As the black stone and acid testing method is crude, laborious, subjective, and limited to analysis of surface characteristics there have been advancements in the art of gold content analysis. Such advancements include the development of non-destructive electronic devices capable of analyzing metal content. One such technology involves the use of x-ray fluorescence (XRF) to analyze a metallic object to determine its content. XRF devices use x-rays to ionize or "excite" elements present in materials. When ionized elements return to a relaxed or stable state, they emit fluorescent x-rays whose energy levels are "signatures" of specific elements emitting these x-rays. XRF devices harness this phenomenon by (1) sending ionizing x-rays into a sample; (2) measuring the energy levels of the returning fluorescent x-rays; and (3) counting these x-rays to determine the relative concentration of each individual element present. An onboard computer provides a complete elemental analysis of the sample and displays it to the user. XRF analyzers, however, are also limited in that they are only capable of analyzing the material at or very near the surface, typically a 10 micron depth, and thus can be fooled by forged gold articles which are merely plated and wherein the core material comprises non-precious metal. In addition, XRF analyzers are best classified as scientific instruments most often employed by professional gold dealers and are not in widespread use by, or widely available to, consumers.

While technological advancements have increased the accuracy with which the content of precious metals can be determined, there remains a need for a system and method of improving precious metals transactions. There further exists a need for an automated system and method that may be widely deployed and readily available to consumers who wish to sell items of precious metal without seeking out a pawn shop or jeweler.

BRIEF SUMMARY OF THE INVENTION

The present invention overcomes the limitations and disadvantages in the art by providing a precious metals transaction system for use in conducting transactions involving articles formed of precious metals, such as jewelry, electronic circuit boards, gold teeth, etc. In accordance with a preferred embodiment, the system employs hardware including: (a) a digital camera for creating a visual record of the article of precious metal that is the subject of the transaction; (b) as scale for determining the weight of the article; (c) an XRF analyzer for determining the precious metal content at the surface of the article; (d) a non-destructive analyzing apparatus capable of determining that the metal forming the article is the same all the way through (such as by use of Ultrasound, or alternatively measurement of electrical conductivity); (e) an Internet connection for obtaining the current price of the precious metal to allow for the establishment of a transaction price. In addition, optional hardware including a fingerprint scanner and a driver's license scanner may be provided to facilitate documentation. The present method thus advances the art of precious metals transactions by precisely analyzing and determining precious metal content and purity, and combining said data with real-time pricing and a digital record of the transaction including the identity of the seller.

In accordance with an automated embodiment of the present invention, a fully automated system is deployed for use by consumers, much like an automated teller machine (ATM). The system is capable of analyzing, weighing, imaging, and valuing, articles formed of precious metal, and is further capable of completing a purchase transaction by providing the seller with cash or other token of value. The automated system includes a chamber having a sample stage for receiving the article, an XRF analyzer for determining precious metal content of an article placed within the chamber, an ultrasound device (or alternatively an eddy current measuring device) for determining the subsurface characteristics of the article, namely whether the article is formed of a single uniform material, at least one camera for creating a visual record of the article and the transaction (i.e. image of system user), a scale for weighing the article, a wireless or wired communications capability for transmitting and receiving data (such as the current price of gold) for establishing the value, and a dispenser for dispensing cash, tokens, or other articles of value provided to the user in exchange for the article. A computer processor and data storage provide processing functionality. Finally, an integrated Global Positioning System ("GPS") provides location tracking for security purposes.

In accordance with the method of the automated embodiment, a plurality of automated precious metals transaction systems are deployed for use by owners of precious metals in locations wherein they are readily available to the public. An owner of an article formed of precious metal, such as a gold necklace, who desires to convert the value of the article to cash activates the system for a new transaction (hereinafter the "user"). Once activated the system instructs the user to place the article on the sample stage within the receiving chamber. Once within the receiving chamber the article is imaged, weighed, and analyzed for alloy content and uniformity of material. More particularly, one or more cameras capture and store images of the article and of the user. A scale weighs the article and the weight is recorded and stored. The precious metals analyzer analyzes and identifies the metallic content of the article to high accuracy. In addition, the article is subjected to ultrasound analysis to verify that it is not merely plated, but is uniform throughout. A communications link (either wired or wireless) functions to confirm current/real time precious metals pricing by electronic communication with a gold exchange or other suitable gold pricing source for the determination of the market price for gold bullion. Finally, the computer processor processes the input data including precious metal type and purity, weight, and pricing to arrive at a value for the precious metals article. The processor also uses image recognition software to analyze whether the article includes non-precious metal, such as stones (e.g. ruby, diamond, etc.) Once the user confirms his/her desire to complete the transaction, the cash (or other token of value) is dispensed and the article is secured within the system. In addition, appropriate documentation may be automatically forwarded to the local police department, or other governmental authorities, providing notice of the transaction.

Accordingly, it is an object of the present invention to provide advancements in the field of precious metals transactions.

Another object of the present invention is to provide an automated system capable of autonomously conducting transactions involving articles formed of precious metals.

Yet another object of the present invention is to provide such a system capable of receiving articles formed of precious metal, analyzing metal content and uniformity, establishing a value for said article, and purchasing said article in exchange for its monetary value.

In accordance with these and other objects, which will become apparent hereinafter, the instant invention will now be described with particular reference to the accompanying drawings.

DETAILED DESCRIPTION OF THE INVENTION

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. As used herein the term "alloy" shall generally refer to precious metals or material containing significant precious metals content, including without limitation, gold, platinum, and silver.

Figure 1:
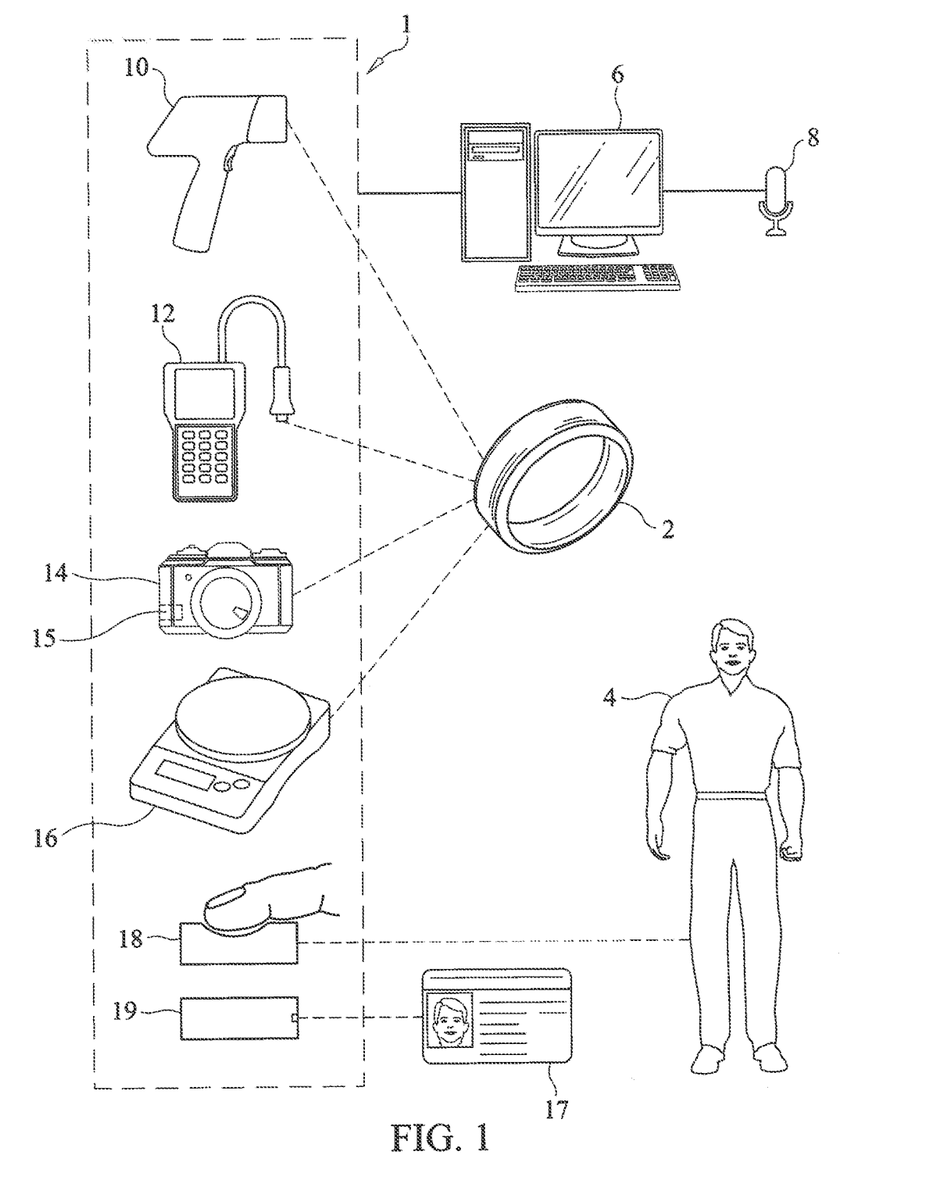
FIG. 1 is a hardware block diagram of a kit for practicing the systems and methods for purchasing articles of precious metal in accordance with the present invention.

Turning now to the drawings, FIG. 1 provides a hardware block diagram for purchasing precious metals in accordance with the present invention. The hardware components are preferably provided as a kit, generally referenced as 1. The components include an XRF precious metal analyzer 10 that functions to analyze a precious metal article 2 (e.g. gold ring) to determine precious metal content. The XRF analyzer may be a hand-held model (as illustrated) or in the alternative may comprise a table-top model. The use of XRF analysis is significant as it provides a highly accurate, non-destructive means for determining the elemental composition of jewelry alloys, such as gold. Suitable XRF analyzer systems are available from Olympus Corporation, Thermo Fisher Scientific (Billerica, Mass., USA), and Bruker AXS Microanalysis GmbH (Germany). XRF analyzer 10 is preferably capable of simultaneous analysis of precious metals, including gold (Au), silver (Ag), platinum (Pt), and palladium (Pd), and other common alloying elements. The XRF analyzer is used in a point and shoot manner by properly placing the XRF analyzer substantially adjacent to the article and activating the activation button. Once the surface alloy content has been determined by the XRF analyzer 10, a second hand-held uniform alloy content analysis device 12 is used to confirm that the metal content is uniform throughout the thickness of the article 2. Device 12 preferably comprises a hand-held electronic device that detect counterfeit precious metal articles via electrical conductivity based on the fact that various metal alloys and fine gold differ in their electrical conductivity. Such devices work non-destructively and utilize the eddy current method according to ASTM E 1004. A suitable such device is available from Helumt Fischer GmbH & Co. under the registered trademark SIGMASCOPE (Reg. No. 1,199,372). Such a device is capable of measuring the conductivity of layers of metals in the range of up to approximately 8.0 millimeters. Double-sided measurements will allow for larger articles to be analyzed up to a thickness of approximately 17.0 millimeters.

In the alternative, device 12 may comprise an ultra-sound device capable of determining whether the precious metal article has a uniform material cross-section, that is, that the material is the same all the way through, using sound waves. Ultrasound is a cyclic sound pressure wave with a frequency greater than the upper liming of the human hearing range. Ultrasound functions to determine the subsurface characteristics of the article, namely to confirm whether the article is formed of a single uniform material. If the article is found to be of uniform material a transaction may be completed. If, however, the ultrasonic analysis determines that the article is not formed of a single material, the transaction may not be completed as the article may be gold plated or other lesser value structure.

A digital camera 14 is provided for creating a visual record of the article. Camera 14 includes a suitable data storage device 15, such as a computer hard drive, flash memory, or smart card for maintaining a digital image record of the article. In addition, camera 14, or alternatively a second camera, captures an image of the Seller and/or the Seller's identification (e.g. Driver's License). A scale 16 is provided to determine the weight of the article. Scale 16 is preferably a digital scale having an output for communicating the measured weight of the article to a data storage medium, such as a computer server.

Kit 1 further includes hardware components for determining and recording the identity of the Seller. More particularly, a fingerprint scanner 18 is provided for capturing and recording the Seller's fingerprint (e.g. thumb print). In addition, a scanner 19 is provided to capture and record an image of the Seller's photo-identification, such as a driver's license. Scanner 19 also preferably includes an output for transferring scanned photo-identification, such as a driver's license. One or more of the devices 10, 12, 14, 16, 18, and 19 may be in data communication with a computer server or personal computer 6 such that all captured data may be electronically stored in a transaction data file. Personal computer 6 may further be adapted with voice recognition capability and a microphone 8, or other biometric access control to limit access to the stored transaction data. Microphone 8 is further employed to allow either the seller and/or system operator to provide a verbal description of the precious metal article whereby voice recognition software residing on computer 6 may convert the verbal description to text.

Figure 2:
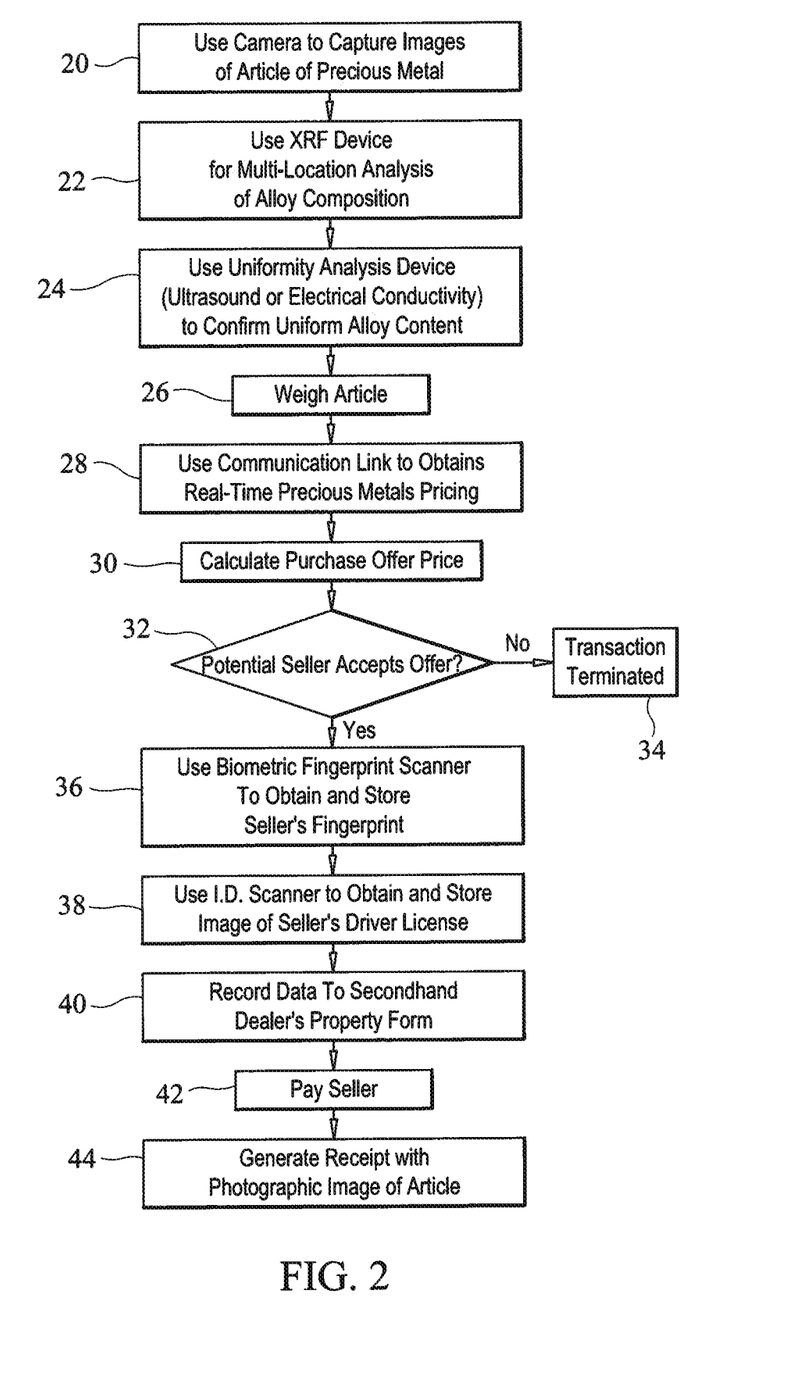
FIG. 2 is a flowchart illustration of a method for purchasing articles of precious metals.

With reference to FIG. 2, a method of conducting the sale of an article of precious metals is disclosed. A seller 4 comprises a potential seller having rightful possession, free and clear of encumbrances, to an article of precious metal 2. In accordance with a first step 20, the seller 4 presents article 2, and camera 14 is used to capture and store one or more digital images of the article. The next step 22 involves use of the XRF device 10 to conduct an analysis of the alloy composition. In a preferred embodiment, the analysis is conducted at multiple locations. In accordance with the third step 24, the hand-held uniform alloy content analysis device 12 is used to confirm that the metal content is uniform throughout the thickness of the article. As noted above, device 12 may confirm the uniformity of the cross-sectional material using either ultrasound or electrical conductivity. The next step 26, involves the use of scale 16 to weigh the object. If the article 2 consists of a combination of precious metals and other material, such as stones, further analysis may be required in order to adjust for the weight of the stones and place a value thereon. In accordance with the next step 28, a communication link such as an Internet link is used to obtain real-time precious metals pricing from a reputable precious metals exchange source whereby the current market price of gold bullion (or other precious metal, e.g. platinum, silver, etc.) is determined. The next step 30 involves calculating a price for the article based on its weight and precious metals content. Once the price is determined, a suitable offer is made to the potential seller. As should be apparent, the offer is preferably based purely on the value of the precious metal and includes a suitable mark-up or profit margin. In accordance with the next step 32, the potential Seller then must decide whether he/she wishes to accept the offer. If the seller declines the offer the transaction is terminated 34. If the seller accepts the offer 36, the biometric fingerprint scanner 18 is used to obtain a digital scan of the seller's fingerprint, and the fingerprint scan is stored on a computer database. The next step 38 involves the use of I.D. scanner 19 to scan the seller's driver's license 17. A further step 40 involves using the captured transaction data to populate a secondhand dealer's property form or bill of sale with transaction information such as the seller's identification, a description of the precious metals article, and other pertinent information. The populated form may further be adapted to receive the seller's signature and contain the seller's representations as to rightful ownership of the article, and lack of any liens or encumbrances. The next steps involve paying the seller, referenced as 42, and generating a receipt having photographic image of the article 44. The data collected by the various devices 10, 12, 14, 16, 18, 19, as well as the text description, may be electronically transferred to the local police department (or other governmental agency) in accordance with the standards adhered to by dealer's in second hand goods in the locality.

Automated Transaction System

Figure 3:
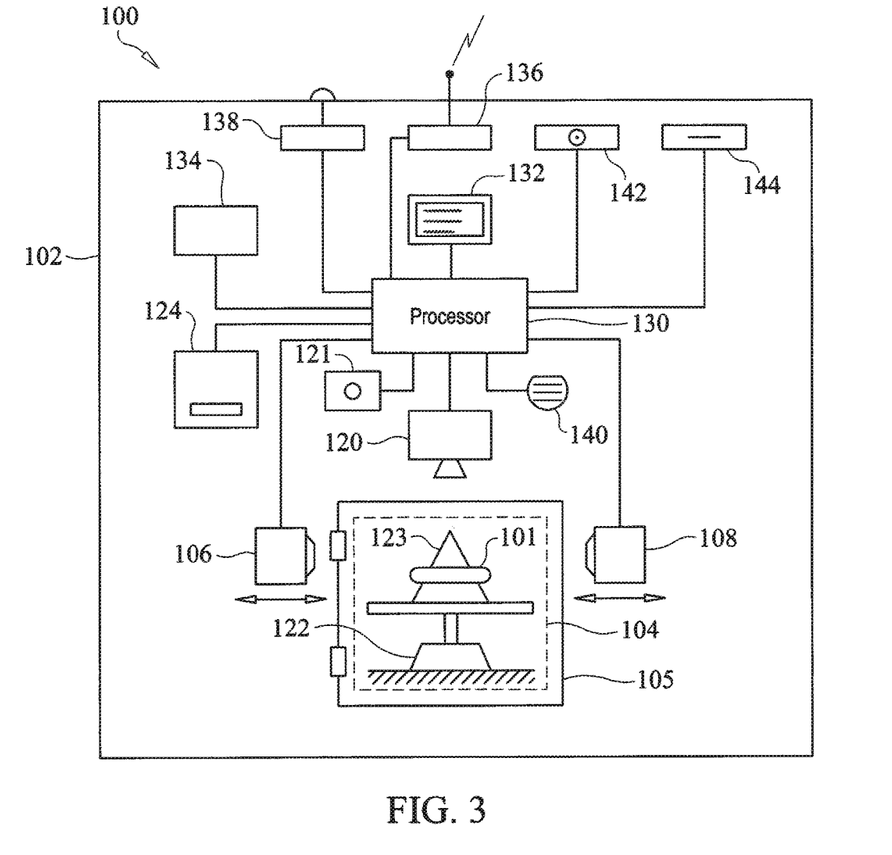
FIG. 3 is a schematic illustration of an automated precious metals transaction system in accordance with the present invention.

FIG. 3 is a schematic illustration of an automated precious metals ("APM") transaction system, generally referenced as 100, in accordance with the present invention. Automated precious metals transaction system 100 is capable of conducting transactions (e.g. an exchange of goods for cash) involving articles formed of precious metals, such as jewelry. System 100 is capable of analyzing, weighing, imaging, and valuing, articles formed of precious metal, generally referenced as 101. The system functions in an automated manner to allow an owner of an article of precious metal, such as a gold necklace, to exchange or "sell" the article for cash, or other token of value. In a preferred embodiment, system 100 is configured as a standalone device, similar to an automated teller machine, intended to be installed at a particular location for automated operation. In an alternate embodiment, however, system 100 may be configured as a portable device. System 100 includes a number of subsystems that function to analyze articles of precious metal to determine metal content, purity, and uniformity of structure, as well as weighing, photographing, and determining real time value based on current precious metal pricing.

Automated system 100 includes a housing 102 for containing the electro-mechanical subsystems, processing systems, and communications systems, in a secure, weather-tight enclosure. Housing 102 may be made of steel or any suitable material. Housing 102 includes an analysis chamber 104 for receiving a precious metal article, referenced as 100. Access to the analysis chamber 104 is preferably restricted by an access door 105. Within the analysis chamber are a plurality of mounts which are provided to receive specific types of articles. FIG. 3 illustrates a conical mandrel 123 suitable for mounting selected precious metals articles, such as a gold ring 101.

System 100 further includes an XRF precious metal analyzer 106 that functions to analyze the article 101 placed within analysis chamber 104 to determine precious metal content. The use of XRF analysis is significant as it provides a highly accurate, non-destructive means for determining the elemental composition of jewelry alloys, such as gold. Suitable XRF analyzer systems are available from Olympus Corporation, Thermo Fisher Scientific (Billerica, Mass., USA), and Bruker AXS Microanalysis GmbH (Germany). XRF analyzer 106 may be movably mounted within housing 102 to allow the analyzer to move into at least one, and preferably several, suitable position(s) substantially adjacent to the article 101 within analysis chamber 104 to allow the XRF precious metal analyzer to conduct a thorough analysis. Accordingly, XRF analyzer 106 may be mounted on an articulating control arm adapted to selectively move the device to one or more suitable positions to allow for analysis of article 101 from multiple locations.

System 100 further includes an ultrasound device 108 to allow for ultrasonic analysis of the article. Ultrasound is a cyclic sound pressure wave with a frequency greater than the upper liming of the human hearing range. Ultrasound device 108 functions to determine the subsurface characteristics of the article, namely to confirm whether the article is formed of a single uniform material. If the article is found to be of uniform material a transaction may be completed. If, however, the ultrasonic analysis determines that the article is not formed of a single material, the transaction may not be completed as the article may be gold plated or other lesser value structure. Ultrasound device 108 may be movably mounted within housing 102 to allow the analyzer to move into at least one suitable position substantially adjacent to the article contained within analysis chamber 14 to allow the device to conduct a thorough analysis at at least one location on the article. Ultrasound device 108 is adapted to include a gel dispenser to allow for the dispensing of a conductive ultrasound gel that functions to allow the ultrasonic waves to be transmitted direction to the article as is customary in the ultrasound art. The ultrasound device 108, however, should movably mounted so as to enable the device to systematically move completely across the surface of the article. Further, ultrasound device 108 may be adapted with a dual angular transducer to allow for ultrasonic analysis of articles that do not have flat surfaces. In a contemplated alternate embodiment, device 108 may comprise an electronic device that detects counterfeit precious metal articles via electrical conductivity. Such technology is available from Helumt Fischer GmbH & Co. Such a device is capable of measuring the conductivity of layers of metals in the range of up to approximately 8.0 millimeters. Double-sided measurements will allow for larger articles to be analyzed up to a thickness of approximately 17.0 millimeters.

System 100 is further adapted to include at least one digital camera 120 is provided for creating a visual record of the article. Camera 120 is preferably in electrical communication with a suitable data storage device 134, such as a computer hard drive, flash memory, or smart card. In addition, camera 120, or alternatively a second camera 121, captures an image of the potential Seller. A digital scale 122 is also provided to determine the weight of the article. A dispenser 124, such as a cash dispenser, is provided for embodiments wherein the transaction is a monetary transaction. The dispenser may dispense cash, debit cards loaded with the agreed upon value, credit vouchers, or any other suitable token of appropriate value.

The various data generated by the XRF subsystem 106, ultrasound subsystem 108, camera 120, and scale 122, are fed to a computer processor 130. System 100 further includes a touch screen electronic display 132 for receiving input and providing visual output. Processor 130 is also in electronic communication with a data storage system 134, a wireless (or wired) communications module 136, a GPS module 138, a microphone 140, a biometric fingerprint scanner 142, an identification scanner 144, and a dispensing mechanism 146 for dispensing cash, credited debit cards, or vouchers.

Processor 130 is programmed calculate the value of the article. For example, the value of a gold necklace may be determined once the XRF subsystem 106 confirms the elemental composition of the article, and the ultrasound system 108 confirms that the elemental composition is uniform throughout the device (i.e. not merely gold plated).

Processor 130 is further programmed to analyze an image of the article in order to determine whether the article contains non-precious metal elements, such as stones (e.g. diamonds, rubies, etc.). The communications module 136 establishes a link to a reputable gold trading exchange and retrieves the current price for gold and/or other precious metal. For an embodiment wherein the electronic communication is wireless, the APM system may use the Bluetooth wireless standard, wireless communication with a router connected to the Internet, cellular network communication, or any other suitable communications technology, network, or system. Suitable sources for electronically obtaining real-time gold pricing include www.monex.com, www.chicagopreciousmetalsexchange.com, or any other suitable source. Using the elemental composition and weight of the article, the processor determines the value of the gold content of the article. This value provides a benchmark for determination of an offer made to the owner of the article, which offer will be less than the actual value to allow for the realization of a profit by the operator of the system. If the owner accepts the offer, cash may be dispensed via dispenser 124. The system further has the capability to wirelessly transmit images of photographed articles and of the user to law enforcement agencies for comparison to stolen items.

Figure 4A:
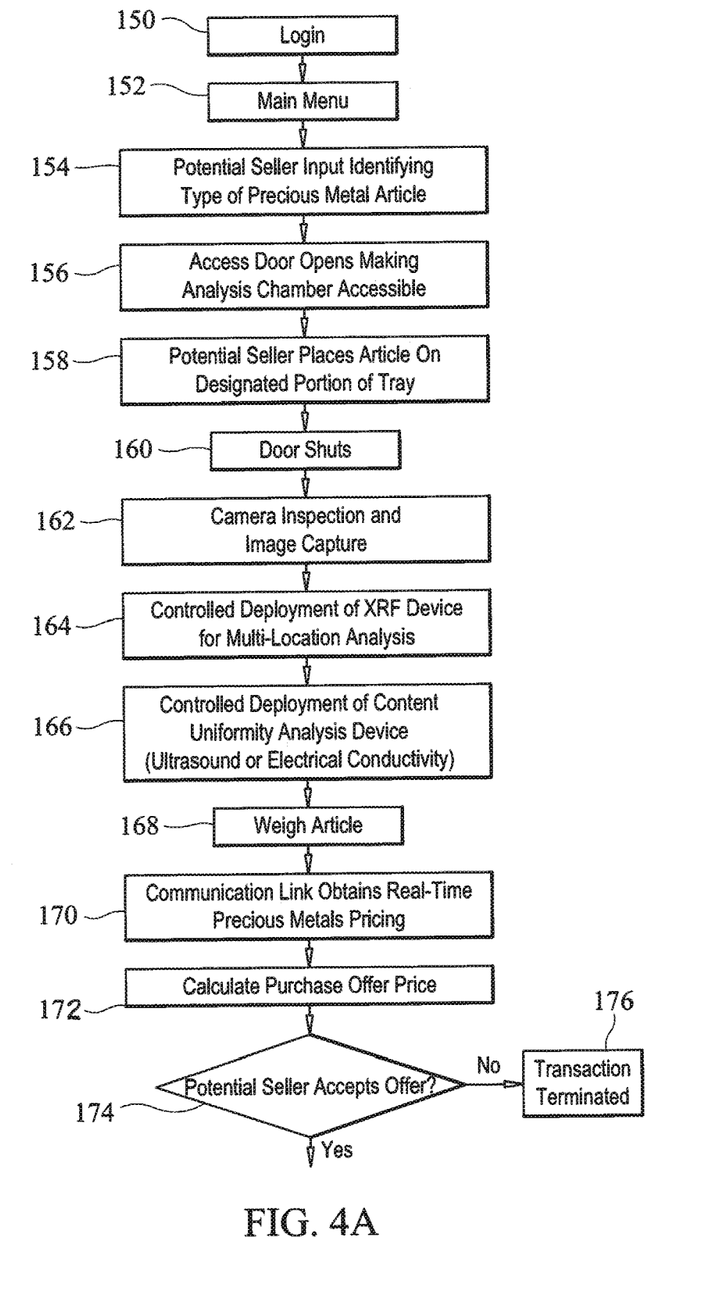
FIGS. 4A and 4B provide a flowchart illustration of an automated method for purchasing articles of precious metal using the automated precious metals transaction system illustrated in FIG. 3.
Figure 4B:
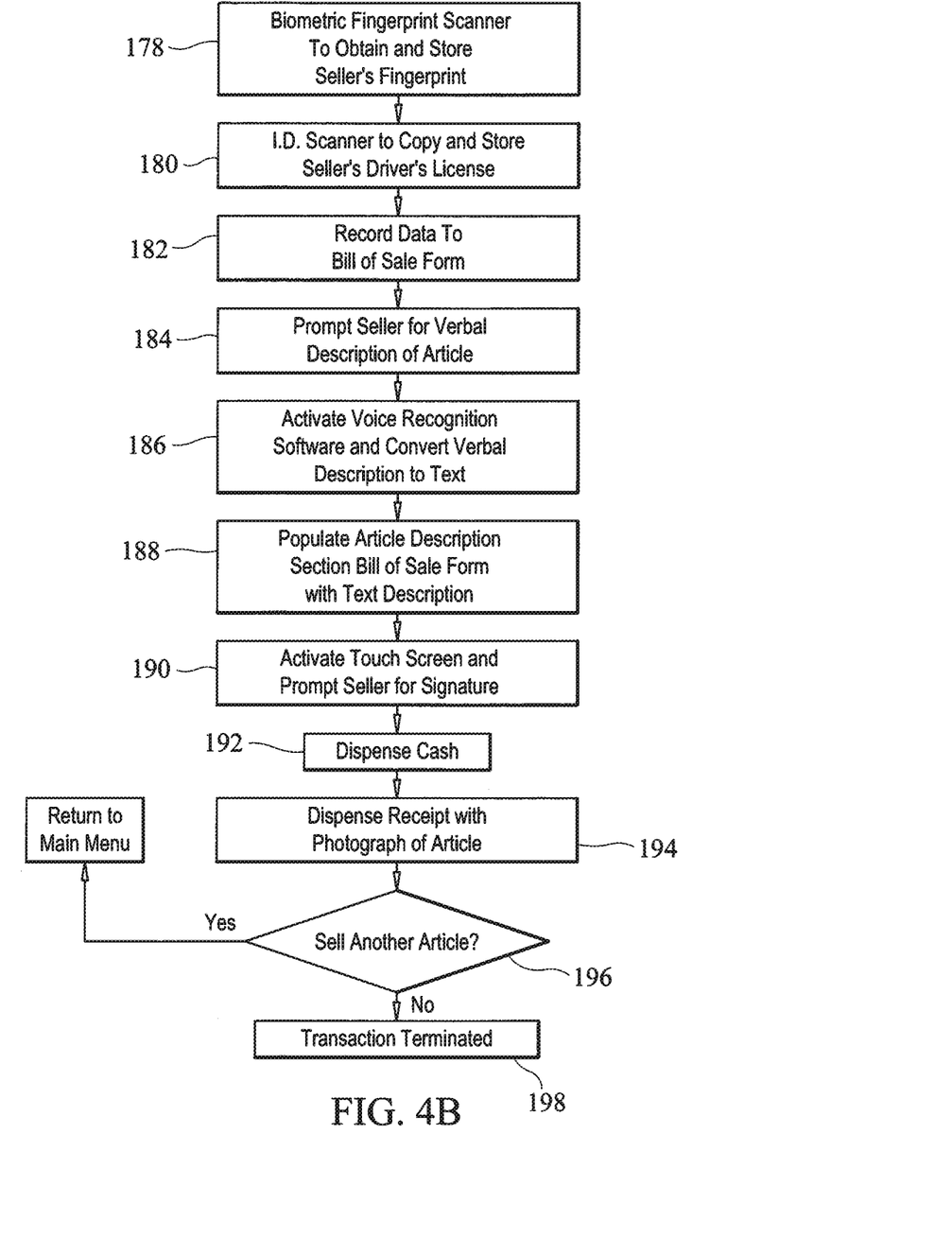

As should now be apparent, the present invention presents a novel method for conducting automated consumer transactions involving articles formed from precious metals. FIGS. 4A and 4B provide a flowchart illustration for an automated method for conducting precious metals transactions in accordance with the present invention. In accordance with this method, a plurality of APM transaction systems 100 are deployed for use by owners of precious metals in locations wherein they are readily available to the public. The APM systems may be installed as fixed units (e.g. similar to an ATM), or maybe provided as portable units. A seller owning an article formed of precious metal 100 comprises a potential seller in the context of the transaction. The article may comprise a gold ring, necklace, or any other suitable article which the consumer desires to sell. The seller activates the system 100 for a new transaction illustrated by login step 150. In accordance with the next step 152, a main menu is displayed on a touch screen electronic display 132. In the next step 154, the menu prompts the potential seller to provide input that identifies the type of precious metal article that will be the subject of the analysis and potential purchase transaction. Upon receipt of said input the access door opens 156 providing access to the analysis chamber. As noted above, the access chamber includes one or more mounts 158 for securely receiving the article of precious metal. The system is preferably programmed and suitably adapted to present the ideal mount 158 for the precious metals article based on the description provided by the potential seller in step 154. When the article is placed on mount 158 the access door shuts 160. During the next step 162, camera 120 is activated to capture one or more images of the precious metal article from one or more locations. Camera 120 may be movably mounted such that is can be selectively positioned by pre-programmed movement, or in the alternative, a plurality of cameras may be provided. The captured image(s) is stored by data storage device 134. Further, the captured images are preferably analyzed by processor 130 using image analysis software to determine whether the article includes non-precious metal content, such as stones (e.g. diamonds, rubies, etc). If analysis of the images of the article taken by the one or more cameras determines that the article includes stones, such as diamonds or rubies, then the transaction may be cancelled or postponed pending further valuation.

The precious metal article is then subjected to analysis by the XRF precious metal analyzer 106 to determine alloy content as illustrated by step 164. In step 166, ultrasound device 108 (or alternatively the electrical conductivity analysis device) functions to determine the subsurface characteristics of the article, namely to confirm whether the article is formed of a single uniform material. The scale 122 then determines the weight of the device as illustrated by step 168. Next a communications link obtains real-time precious metals pricing from a reputable precious metals exchange based on the results of the XRF analysis as illustrated by step 170. A purchase offer price is determined by processor 130 based on the precious metal alloy content of the article and the real-time pricing data as illustrated in step 172. As should be apparent, the offer is preferably based purely on the value of the precious metal and includes a suitable mark-up or profit margin.

The potential seller then must indicate by appropriate input whether he/she accepts or declines the offer as illustrated by step 174. If the offer is declined, the transaction is terminated as illustrated by step 176, and the precious metal article is returned to the user. If the offer is accepted, step 178 provides that the seller is instructed to use the biometric fingerprint scanner 142 to provide a biometric sample which is stored by data storage sub-subsystem 134. As illustrated by step 180, the seller is prompted to insert his/her driver's license (or other suitable picture I.D.) into scanner 144 whereby a copy is obtained and stored by data storage sub-system 134. The seller's (e.g. seller's) information is then recorded to a bill of sale document, also referred to as "Secondhand Dealer's Property Form." That document includes fields for the seller's information (e.g. name, address, d.o.b., driver's license number etc.), as well as fields dedicated to describing the article (e.g. description, serial number, type, brand, etc.). System 100 preferably auto populates the seller's information based on the scanned driver's license information supplemented with the seller's input and confirmation of accuracy as shown in step 182. The system further prompts the seller to record a verbal description of the article using microphone 140 as illustrated by step 184. The verbal description is processed to a text file by processor 130 using suitable voice recognition software as illustrated by step 186. The text file is used to populate the "item description" section on the bill of sale document per step 188. In accordance with step 190, touch-screen 132 is activated and the Seller is prompted to execute the bill of sale document by inputting his/her signature using touch-screen 132. Upon execution of the bill of sale, dispenser 146 is activated to dispense the agreed upon purchase amount, either in the form of cash, a credited debit card, or voucher as illustrated by step 192. In accordance with step 194, the system further dispenses a receipt including a photograph of the article. In accordance with step 196, the system will inquire whether the seller wishes to sell another article. If the seller does not, the transaction is complete as illustrated by step 198. If the seller does wish to sell another item, the system resets to the main menu, namely step 152 as the seller remains logged in as illustrated by step 200.

Finally, the APM transaction systems disclosed herein may be adapted for uses other than conducting precious metals transactions. For example, the present inventors contemplate adapting the APM technology disclosed herein for use in security operations. In accordance with this embodiment, a portable or non-portable version of the APM system is provided, not for the purpose of conducting a transaction, but for use in security, such as use by the Department of Homeland Security and/or Transportation Security Agency (TSA) in screening metal objects passing through security checkpoints.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method of conducting a sales transaction between a seller and a buyer involving an article formed of precious metal, said method including the steps of:
   prompting the seller to identify the type of article;
   prompting the seller to place the article on a mount in an analysis chamber, said mount automatically selected from a plurality of mounts based on article type;
   capturing photographic images of the article using a digital camera, and electronically storing said photographic images in a transaction data file on a computer data storage device;
   analyzing said photographic images to determine whether the article includes non-precious metal material;
   terminating the transaction if the article is determined to include material other than precious metal;
   determining the weight of said article using a digital scale, and electronically storing the determined weight in said transaction file;
   determining the surface alloy composition of said article using an XRF analysis device, and electronically storing the determined surface alloy composition in said transaction file;
   determining whether the composition of the article is uniform throughout by analyzing the electrical conductivity of the article, and electronically storing the composition uniformity determination in said transaction file;
   terminating the transaction if the composition of the article is not determined to be uniform, and continuing the transaction if the composition of the article is determined to be uniform;
   initiating a wireless communications link to a precious metals exchange and determining the current market value of precious metal matching said determined surface alloy composition, and electronically storing the determined market value in said transaction file;
   determining an offer price for the purchase of said article using the determined weight of the article, the determined alloy composition of the article, and the determined market value of a precious metal matching the surface alloy composition;
   displaying a purchase offer to the seller on an electronic display;
   confirming the seller's acceptance of said purchase offer;
   obtaining a biometric fingerprint sample from the seller using a fingerprint scanner, and storing said fingerprint sample in said transaction file;
   obtaining a digital copy of the seller's driver's license using a document scanner, and storing said copy in said transaction file;
   recording a verbal description of the article by the seller, and saving said verbal description in said transaction file;
   converting said verbal description to a text file using voice recognition software, and saving said text file in said transaction file;
   generating a bill of sale form to document the transaction by populating fields using data from said transaction file, said data including information obtained from the seller's driver's license, including name, address, date of birth, and driver's license number, a text description of the article obtained from said text file, at least one image of the article, and a printout of said biometric fingerprint sample;
   obtaining an executed bill or sale by receiving the seller's signature using a touch-screen display, and storing;
   paying the seller for the article upon seller's execution of said bill of sale by dispensing payment in the form of a pre-paid debit card; and
   electronically transmitting said bill of sale form to a local law enforcement agency.

2. An automated apparatus for conducting a sales transaction between a seller and a buyer involving an article formed of precious metal, said automated apparatus comprising:
   a housing including:
   a computer including a processor, a touch-screen electronic display adapted to generate electronic display output and to receive user input, a data storage device, a microphone, a wireless communication module, and a printer;
   an analysis chamber accessed via an openable closure;
   a mount disposed within said analysis chamber and adapted to receive an article formed of precious metal;
   a digital scale coupled to said mount and configured to weigh the article placed thereon, said digital scale in electronic communication with said computer to store the determined weight of said article on said data storage device;
   at least one digital camera configured to capture digital images of the article, said digital camera in electronic communication with said computer to store said captured digital images on said data storage device;
   an XRF analysis device configured to determine the surface alloy composition of the article at least one location, said XRF analysis device in electronic communication with said computer to store the determined surface alloy composition on said data storage device;
   a uniform alloy content analysis device configured to confirm whether the alloy composition throughout the article is uniform with the surface alloy composition, said uniform alloy content analysis device in electronic communication with said computer to store content uniformity confirmation data on said data storage device;
   said computer configured to calculate an offer price for the purchase of said article based on the weight of said article as determined by said scale, the precious metal content of said article as determined by said XRF analysis device, and the market value of precious metals obtained by real-time communication with a precious metals exchange;
   said electronic display configured to display output, including a purchase offer to the seller and prompting said seller to either accept or reject said purchase offer;
   said electronic display configured to receive user input to confirm the seller's acceptance or rejection of said purchase offer;
   a biometric fingerprint scanner configured to obtain a biometric fingerprint sample from the seller, said biometric fingerprint scanner in electronic communication with said computer to store said biometric fingerprint sample on said data storage device;

a document scanner configured to obtain a digital copy of the seller's drivers license, said document scanner in electronic communication with said computer to store said digital copy on said data storage device;

said microphone adapted to record a verbal description of the article annunciated by the user, said verbal description converted to text by said computer and saved as a text file on said data storage device;

a bill of sale generated by said computer and output by said printer, said bill of sale including information identifying the seller as obtained from the digital copy of the seller's driver's license, a text description of the article obtained from said text file, at least one of said images of said article, and a printout of said biometric fingerprint sample;

a dispenser for dispensing cash or a pre-paid debit card to pay the seller for said article; and said communications module configured to electronically transmit a copy of said bill of sale to a local law enforcement agency.

3. The automated apparatus according to claim 2, wherein said uniform alloy content analysis device comprises an ultrasound instrument.

4. The automated apparatus according to claim 2, wherein said uniform alloy content analysis device comprises an electrical conductivity analysis device.

\* \* \* \* \*